United States Patent [19]
Ando et al.

[11] Patent Number: 5,537,387
[45] Date of Patent: Jul. 16, 1996

[54] INFORMATION STORAGE DISK WITH DISPLAY DATA RECORDED IN A LEAD-IN REGION AND AN APPARATUS FOR RECORDING AND/REPRODUCING THE DISC

[75] Inventors: Ryo Ando, Tokyo; Tadao Yoshida; Katsuaki Tsurushima, both of Kanagawa, all of Japan

[73] Assignee: Sony Corporation, Tokyo, Japan

[21] Appl. No.: 439,471

[22] Filed: May 11, 1995

Related U.S. Application Data

[63] Continuation of Ser. No. 171,263, Dec. 21, 1993, Pat. No. 5,521,900, which is a continuation of Ser. No. 736,046, Jul. 25, 1991, abandoned.

[30] Foreign Application Priority Data

Aug. 24, 1990 [JP] Japan .................................. 2-221364

[51] Int. Cl.⁶ .................. G11B 7/24; G11B 3/90
[52] U.S. Cl. ...................... 369/275.1; 369/58; 369/275.3
[58] Field of Search ................ 369/275.3, 275.1, 369/13, 275.2, 32, 47, 48, 54, 58; 360/59, 114; 365/122

[56] References Cited

U.S. PATENT DOCUMENTS

| | | | |
|---|---|---|---|
| 4,587,643 | 5/1986 | Monen et al. | 369/32 |
| 4,731,774 | 3/1988 | Furukawa | 369/59 |
| 4,870,515 | 9/1989 | Stokes | 360/72.2 |
| 4,893,193 | 1/1990 | Nakamura et al. | 358/341 |
| 4,932,016 | 6/1990 | Yoshida et al. | 369/48 |
| 4,953,035 | 8/1990 | Yoshio | 358/335 |
| 4,996,679 | 2/1991 | Yoshio | 369/33 |
| 5,058,096 | 10/1991 | Ando et al. | 369/100 |
| 5,077,721 | 12/1991 | Sako et al. | 369/59 |
| 5,111,442 | 5/1992 | Nakajima et al. | 369/47 |
| 5,124,963 | 6/1992 | Ando | 369/32 |
| 5,130,966 | 7/1992 | Yoshio et al. | 369/49 |
| 5,148,418 | 9/1992 | Tsurushima | 369/32 |
| 5,245,600 | 9/1993 | Yamauchi et al. | 369/49 |
| 5,259,649 | 11/1993 | Shomron | 283/114 |
| 5,280,572 | 1/1994 | Case et al. | 395/144 |
| 5,288,860 | 2/1994 | Hale | 434/129 |
| 5,315,579 | 5/1994 | Miura et al. | 369/48 |
| 5,410,525 | 4/1995 | Yokota | 369/32 |
| 5,410,526 | 4/1995 | Maeda et al. | 369/58 |

*Primary Examiner*—Tan Dinh
*Attorney, Agent, or Firm*—Limbach & Limbach

[57] ABSTRACT

An optical disc, and a disc recorder and a disc reproducer therefor, wherein in a lead-in region of the disc table of contents data indicating the record position on the disc of main data, e.g. musical numbers or the like, are recorded as subcodes and display data of, e.g. the titles of the musical numbers, the performers, etc., are also recorded as main data and wherein in a data region on the disc are recorded play data for the musical numbers as well as display data of the titles, performers, etc. of the musical numbers.

13 Claims, 7 Drawing Sheets

MEMORY CONTROL IN RECORDING SYSTEM

MEMORY CONTROL IN REPRODUCING SYSTEM

| | SYSTEM | SOUND QUALITY LEVEL | 16 SECTORS | PLAYBACK TIME |
|---|---|---|---|---|
| CD-I | ADPCM | A LEVEL STEREO | ▨□□□▨□□□▨□□□▨□□□ | 2 HOURS |
| | ADPCM | A LEVEL MONAURAL | ▨□□□□□□□▨□□□□□□□ | 4 HOURS |
| CD-ROM XA | ADPCM | B LEVEL STEREO | ▨□□□□□□□▨□□□□□□□ | 4 HOURS |
| | ADPCM | B LEVEL MONAURAL | ▨□□□□□□□□□□□□□□□ | 8 HOURS |
| | ADPCM | C LEVEL STEREO | ▨□□□□□□□□□□□□□□□ | 8 HOURS |
| | ADPCM | C LEVEL MONAURAL | ▨□□□□□□□□□□□□□□□ | 16 HOURS |
| | PCM | CD-DA | ▨▨▨▨▨▨▨▨▨▨▨▨▨▨▨▨ | 62 ~ 75 MIN. |

FIG. 10

INFORMATION STORAGE DISK WITH DISPLAY DATA RECORDED IN A LEAD-IN REGION AND AN APPARATUS FOR RECORDING AND/REPRODUCING THE DISC

This is a continuation application Ser. No. 08/171,263, filed Dec. 21, 1993, U.S. Pat. No. 5,521,900, which is a continuation of application Ser. No. 07/736,046, filed on Jul. 25, 1991, now abandoned.

BACKGROUND OF THE INVENTION

1. Field of the Invention

This invention relates to a disc having a lead-in region in which table-of-contents data indicating a recording position for a data region are subcoded and recorded, and to a disc recording apparatus and a disc reproducing apparatus employing the disc as a recording medium.

2. Related Art

In a disc apparatus, such as a CD player, adapted for reproducing a compact disc (CD) having concentric tracks on which digital audio data are recorded as a row of pits, a laser beam is irradiated along each track on the disc, as the disc is rotationally driven by a spindle motor at a constant linear velocity (CLV). The digital audio data are reproduced by detecting changes in intensity of the reflected light caused by the presence or absence of pits.

With the above compact disc (CD), a data format is prescribed (standardized), in which each frame is made of a 24-bit synchronizing signals, in the form of Eight-to-Fourteen Modulated data (EFM data) in which 8-bit-per-symbol data are converted into 14 bits or 1 channel bit, 14 bit-per-symbol subcode; 14×32 bit or 32 symbol data such as play data and parity, and 3 bits each provided between adjacent symbols, making a sum of 588 bits, in which a 98, eight bit frames are a subcode block, as shown in FIG. 9. The absolute address of each subcode block is afforded by Q-channel subcode signals and data per se such as play data are processed with each subcode block as one unit. A lead-in region is provided on the radially inner side of a data region in which play data etc. are recorded. In the lead-in region, a time code showing the starting position of each of songs recorded in the data region, song number of the first and the last songs on the disc and a time code showing the end position of the last song, are subcoded and recorded as a Table of Contents (TOC) data showing recording positions in the data region in the form of subcoded signals in the Q channel.

On the other hand, with a so-called CD-Interactive or CD-I system in which video data, letter data etc. are recorded simultaneously with audio data on the compact disc (CD), seven different recording modes are prescribed (or standardized) as audio data, as shown in FIG. 10.

With the CD-DA mode, with the sound quality level corresponding to the current 16 bit PCM, a straight PCM (straight pulse code modulation) with the sampling frequency of 44.1 kHz and the number of quantization bits equal to 16, is employed. With the A-level stereo mode and the A-level monaural mode, with the sound quality equivalent to a long-playing record, an adaptive PCM or ADPCM with the sampling frequency of 37.8 kHz and the number of quantization bits equal to 8 is employed. With the B-level stereo mode and the B-level monaural mode, having the sound quality equivalent to FM broadcasting, an ADPCM with the sampling frequency of 37.8 kHz and the number of quantization equal to 4, is employed. Finally, with the C-level stereo mode and the C-level monaural mode, with the sound quality equivalent to AN broadcasting, an ADPCM with the sampling frequency of 18.9 kHz and the number of quantization bits equal to 4, is employed.

Thus, referring to FIG. 10, the bit reduction rate in the A-level stereo mode as compared to the CD-DA mode is ½, data are recorded at every two sectors and the playback time per disc is about two hours, the hatched square marks representing sectors where data are not recorded. In the A-level monaural mode, as compared to the cd-DA mode the bit reduction rate is ¼, data are recorded at every four sectors and the playback time is about four hours. With the B-level stereo mode, as compared to the CD-DA mode, the bit reduction rate is ¼, data are recorded at every eight sectors and the playback time is about eight hours. With the C-level stereo mode, as compared to the CD-DA mode, the bit reduction rate is 1/18, data are recorded at every 16 sectors and the playback time is about 16 hours.

Recently, a small-sized disc, such as a so-called CD-signal, has been presented to the market, and the tendency is towards further decreasing the disc size.

With the small-sized disc, a space for printing or recording tune data necessary for a user to identify the disc record contents, or so-called label area becomes smaller so that it becomes impossible to write a large number of letters. On the other hand, the letters written in the label area need to be reduced in size and hence become hardly legible.

OBJECT AND SUMMARY OF THE INVENTION

It is therefore an object of the present invention to provide a disc, a disc recording apparatus and a disc reproducing apparatus in which a user may be informed of data concerning songs etc. even when the disc is reduced in size.

It is another object of the present invention to provide an optical disc, a disc recording apparatus and a disc reproducing apparatus in which, in view that, in a conventional compact disc (CD), TOC data indicating recording positions of the data region are simply recorded in the lead-in region as subcoded signals in the Q channel, display data concerning recording contents of the data region are recorded by utilizing the lead-in region.

The present invention provides a disc wherein display data concerning the record contents of a data region are recorded as main data in a lead-in region in which table-of-contents data indicating recording positions of said data region are sub-coded and recorded.

The present invention also provides a disc recording apparatus comprising recording means for recording display data concerning the record contents of a data region of a disc a main data in a lead-in region in which table-of-contents data indicating a record position of said data region are subcoded and recorded.

The present invention also provides a disc reproducing apparatus for a disc in which display data concerning the record contents of a data region are recorded as main data in a lead-in region where table-of-contents data indicating a record position of said data region are sub-coded and recorded, comprising reproducing means for reproducing said display data from said lead-in region, and display means for making a display conforming to the display data obtained by said reproducing means.

With the optical disc of the present invention, display data concerning the record contents of a data region are maintained as main data recorded in a lead-in region.

Thus, with the optical disc of the present invention, data concerning the title of the song etc. as the main data of the TOC data recorded in the lead-in region may be afforded to the user, even if the disc is of a reduced size.

With the disc recording apparatus of the present invention, display data concerning the record contents of the data region are recorded as main data in the lead-in region by recording means. Thus the record contents of the data region may be optionally rewritten by the user in the case of a magneto-optical disc.

Finally, with the disc reproducing apparatus of the present invention, the display data recorded as main data in the lead-in region of the disc are reproduced by reproducing means, while data concerning record contents of the data region are displayed by display means. Thus the user may be positively apprised of data such as title of an song.

BRIEF DESCRIPTION OF THE DRAWINGS

FIG. 10 shows a CD-I data format.

DETAILED DESCRIPTION OF PREFERRED EMBODIMENT

By referring to the accompanying drawings, illustrative embodiments of the present invention will be explained in detail.

Figure 1:
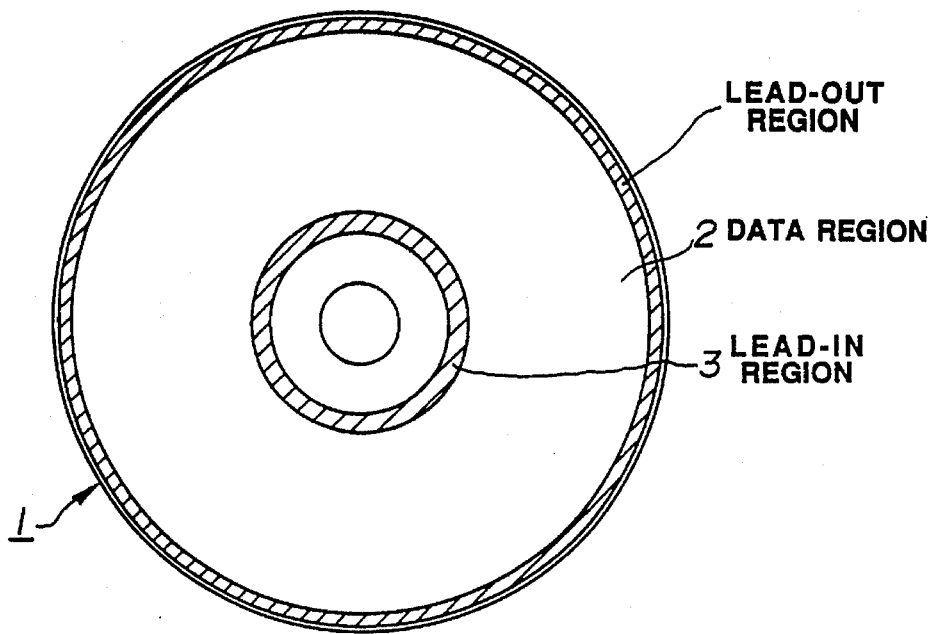
FIG. 1 is a schematic plan showing the construction of a reproduce-only optical disc according to the present invention.

A disc according to the present invention, such as a reproduce-only optical disc 1, shown for example in FIG. 1, has a lead-in region 3 on the radially inner side of a data region 2 on which data such as play data are recorded.

The reproduce-only optical disc 1 conforms to the CD standard. Thus, in the lead-in region 3, a time code $TC_{START}(N)$ showing a start position of each of the songs recorded in the data region 2, an air number of a first air $TNO_{LOWEST}$ and an song number of the last song $TNO_{HIGHEST}$, and a time code $TC_{LEAD-OUT}$ showing an end position of the last song, are subcoded as TOC data showing recording positions of the data region 2 in the form of subcoded signals of the Q-channel, as shown in Table 1.

TABLE 1

| | Contents of TOC for Reproduce-only Disc | | | | |
|---|---|---|---|---|---|
| | subcode Q channel signals | | | | |
| area | P/R | TRACK NO. | INDEX (POINT) | contents | main data contents |
| read-in | P | 0 0 | 0 1 . . . N | $TC_{START}(N)$: start time of each pre-mastered track | title of song, performer, recording date etc. |
| | | | A 0 | $TNO_{LOWEST}$: pre-mastered lowest TNO | title of disc. |
| | | | A 1 | $TNO_{HIGHEST}$: pre-mastered highest TNO | performer, record |
| | | | A 2 | $TC_{LEAD-OUT}$: start time of pre-mastered lead-out | number etc. |

P: Pre-mastered pits

Figure 2:
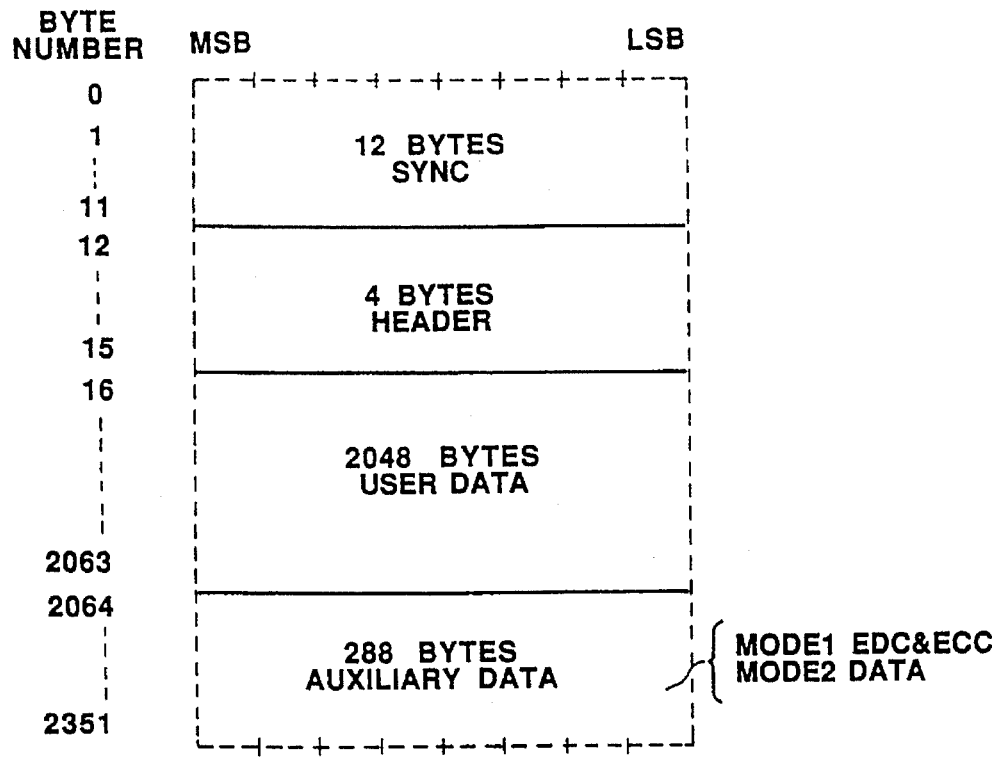
FIG. 2 shows the format of display data recorded as main data in a lead-in region of the optical disc shown in FIG. 1.

With the conventional compact disc (CD), the main data of the TOC data recorded in the lead-in region are all "0". With the optical disc 1 of the present invention, not only are display data for the title, performer and recording data etc. of each song recorded in the data region 2, but also display data for the title, performer and record number etc. of the disc, are recorded as main data of the TOC data in the lead-in region 3. The main data are of the format conforming to the CD-ROM as shown in FIG. 2, so that 2048 byte data and 2336 byte data may be recorded at each point of the subcoded signals of the Q-channel for modes 1 and 2, respectively.

With the above described optical disc 1 according to the present invention, since the display data concerning the record contents in the data region 2, such as songs, are maintained as main data of the TOC data recorded in the lead-in region 3, data such as songs may be afforded to the user as the main data of the TOC data recorded in the lead-in region 3 even when the disc size is reduced.

Figure 3:
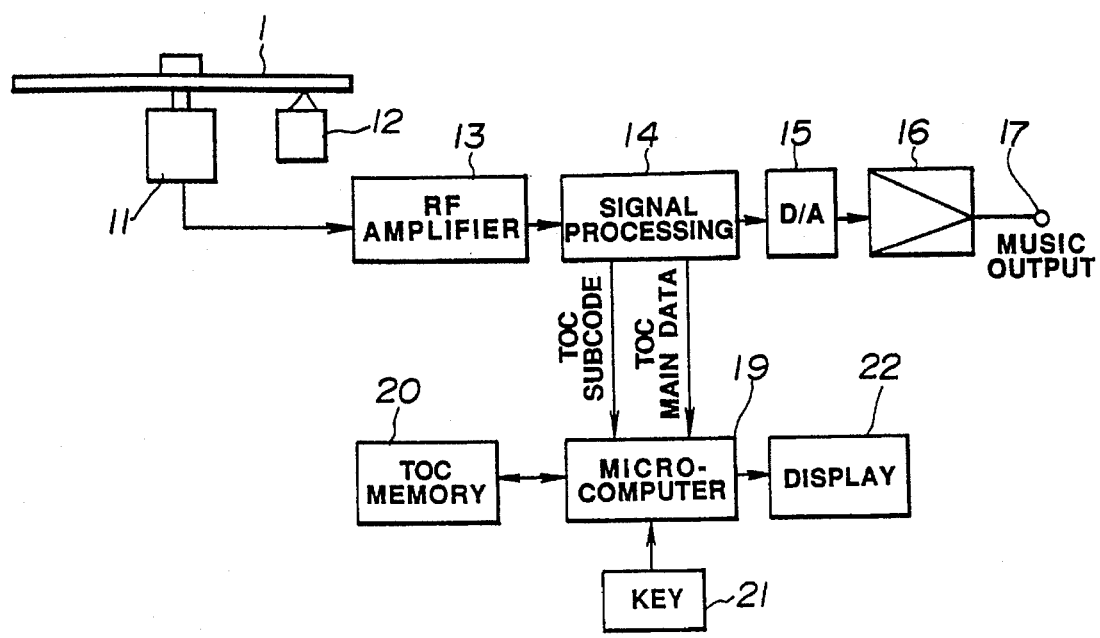
FIG. 3 is a block diagram showing the construction of a disc reproducing apparatus for reproducing the optical disc shown in FIG. 1.

The reproduce-only optical disc 1 according to the-present invention may be reproduced by a disc-reproducing apparatus of the present invention shown for example in FIG. 3.

The disc reproducing apparatus shown in FIG. 3 is a so-called CD player which is adapted for reproducing data by rotating the optical disc 1 by a spindle motor 11 and simultaneously tracing a recording track of the optical disc 1 with a laser light from an optical head 12.

The optical head 12 supplies a playback output obtained by tracing the recording track of the optical disc 1 to an RF amplification circuit 13. The RF amplification circuit 13 amplifies the playback output from the optical disc 1 and transmits the amplified output to a playback processing section 14.

The playback processing section 14 processes the playback output from the optical disc 1 amplified by the RF amplification circuit 13 with a decoding and an EFM decoding in accordance with the CD standard.

The playback output obtained by tracing the recording track of the data region 2 of the disc 1 by the optical head 12 is converted by the processing section 14 into audio data, which audio data are converted into analog data by a D/A converter 15 so as to be outputted at a signal output terminal 17 via an output amplifier 16.

The playback data obtained by the optical head 12 tracing the recording track of the lead-in region 3 of the optical disc 1 is supplied to a system controller 19 after separation of the subcoded Q channel signal at the playback processing section 14. The playback output obtained by the optical head 12 tracing the recording track of the lead-in region 3 of the optical disc 1 has its main data decoded by the playback processing section 14 so as to be supplied to the system controller 19.

The system controller 19 performs a playback control by storing TOC data indicating the recording positions in the data region 2 of the optical disc 1 afforded as the subcoded Q-channel signals supplied from the playback processing section 14, that is, the time code $TC_{START}(N)$ indicating the start position of each air, song number of a first air $TNO_{LOWEST}$, an air number of the last song $TNO_{HIGHEST}$, and a time code $TC_{LEAD-OUT}$ indicating the end position of the last song, in a TOC memory 20, supervising the playback position on the basis of the TOC data, and by reproducing an song bearing an song number designated by the operation of, for example, a key input operating section 21.

The system controller 19 also performs a display control of storing main data of the TOC data supplied from the playback processing section 14, that is the display data concerning record contents of the data region 2 of the optical disc 1, in the TOC memory 20, while performing a display control on the basis of the display data to cause the title or the performer of the song designated on the key input operating section 21 to be displayed on a display section 22.

It is noted that the system controller 19 performs, during the reproducing operation, a display control of automatically displaying the information concerning an song being reproduced on the display section 22 and automatically displaying the information concerning the disc in its entirety on the display section 22 during the cessation mode.

Thus, with the disc reproducing apparatus according to the present invention, since the display data recorded as main data of the TOC data in the lead-in region 3 of the optical disc 1 is reproduced, and the information concerning record contents of the data region 2 of the optical disc 1 is displayed on the display section 22, the user may grasp the record contents of the data region 2 of the optical disc 1 based on the display contents in the display section 22 without relying upon a label etc. of the optical disc 1.

Although the foregoing description has been made of the reproduce-only optical disc 1 and the reproducing apparatus therefore, the present invention may also be applied to a recordable disc, such as a magneto-optical disc, and a recording/reproducing apparatus therefore.

Figure 4:
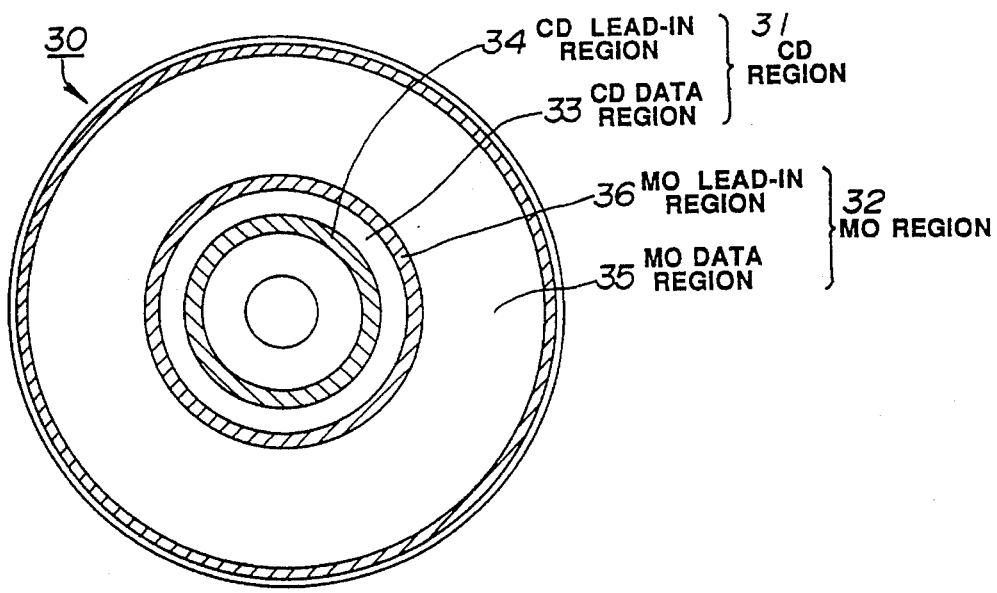
FIG. 4 is a schematic plan view showing the construction of a magneto-optical disc according to the present invention.
Figure 5:
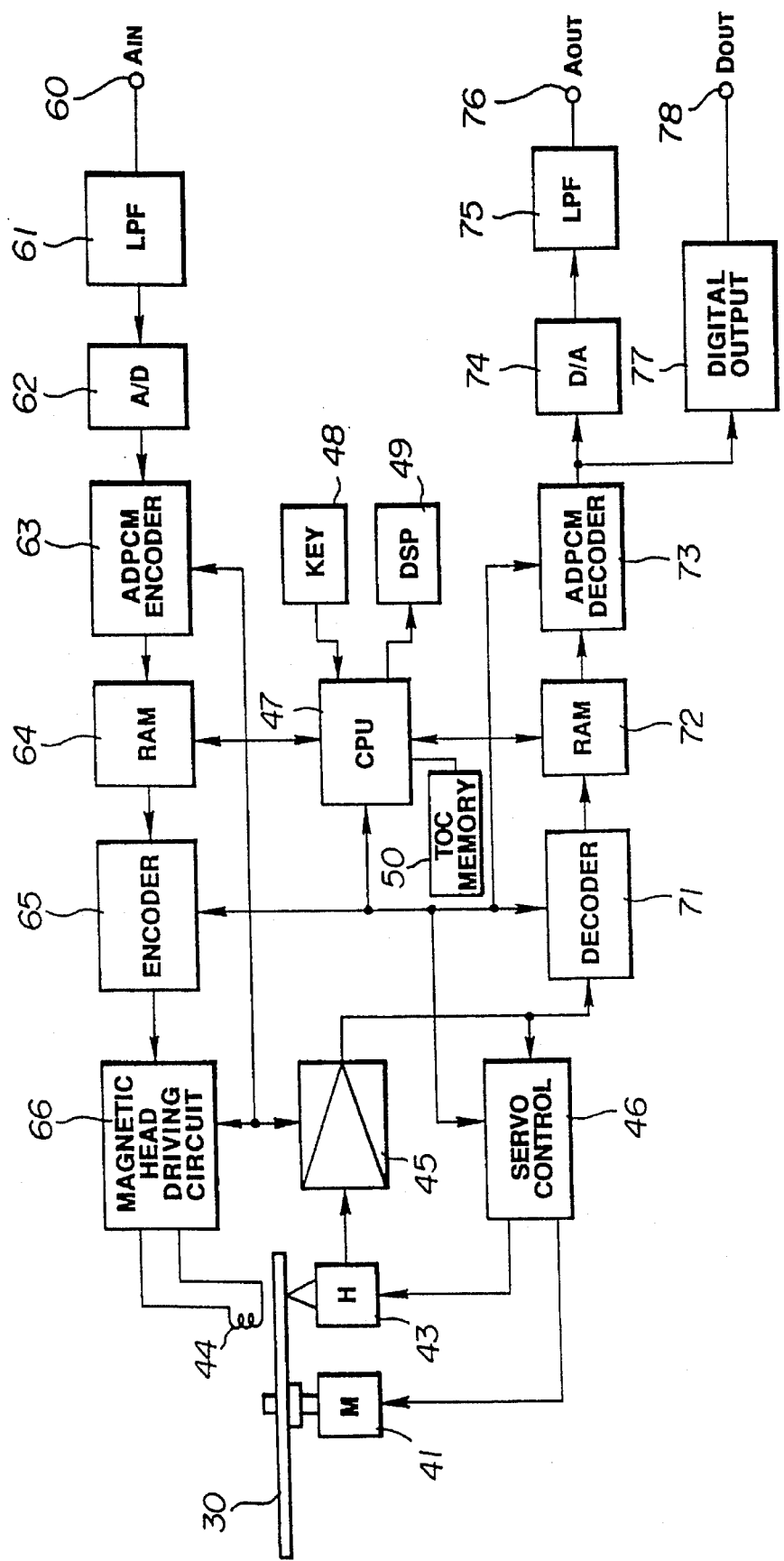
FIG. 5 is a block diagram showing the construction of the magneto-optical disc shown in FIG. 4.
Figure 6:
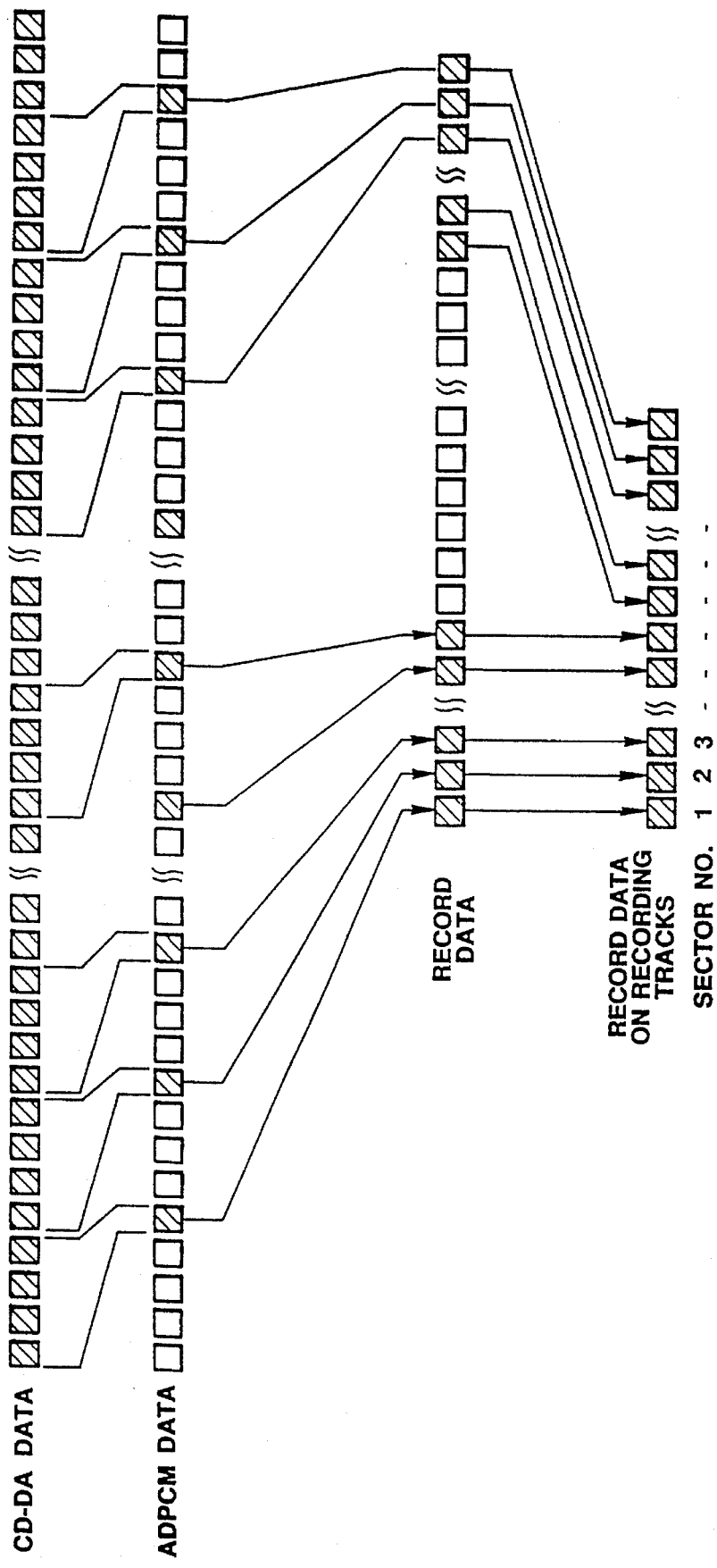
FIG. 6 shows a data format employed in the disc recording/reproducing apparatus shown in FIG. 5.

FIGS. 4 and 5 illustrate a magneto-optical disc 30 according to the present invention, and a disc recording/reproducing apparatus employing the magneto-optical disc 30 as a recording medium, respectively.

This magneto-optical disc 30, conforming to the CD standard, includes a recordable MO region 32 on the outer side of a reproduce-only CD region 31, as shown in FIG. 4.

The CD region 31 includes a CD data region 33 in which data per se, such as play data, is recorded, and a CD lead-in region 34 provided on the inner periphery side of the CD data region. The MO region 32 includes an MO data region 35 in which data per se such as play data may be recorded, and an MO lead-in region 36 provided on the inner periphery side of the MO data region.

Referring to Table 2, showing record contents of the magneto-optical disc 30, there are recorded, in its CD lead-in region 34, as the TOC data indicating recording positions of the CD data region 33 in connection with all of the songs recorded in the CD data region 33, time codes $TC_{START}(N)$ indicating start positions of the songs, an air number $TNO_{LOWEST}$ of the first song of the disc, an song number $TNO_{HIGHEST}$ of the last song of the disc, a time code $TC_{LEAD-OUT}$ indicating the end position of the last song, a time code $TC_{READ-OUT}$ indicating the end position of the last song, a time code $TC_{MO-START}$ indicating the start position of the MO lead-in region 36, a time code $TC_{MO-DATA}$ indicating the start position of the MO data region 35, and characteristics data $MO_{INF}$ such as data for the recording laser power of the MO region 32, as sub-coded Q-channel signals, as well as display data such as the title, player, record numbers etc. of the CD data region 33, besides the title, player, recording data etc. of the songs recorded in the CD data region 33, as main data of the TOC data.

TABLE 2

| | Record Contents of Recording/Reproducing Disc | | | | |
|---|---|---|---|---|---|
| | subcode Q channel signals | | | | |
| area | P/R | TRACK NO. | INDEX (POINT) | contents | main data contents |
| read-in | P | 0 0 | 0 1 . . . N | $TC_{START}(N)$: start time of each pre-mastered track | title, performer, recording data etc. of each song of the CD data region |
| | | | A 0 | $TNO_{LOWEST}$: pre-mastered | title, |

TABLE 2-continued

Record Contents of Recording/Reproducing Disc subcode Q channel signals

| area | P/R | TRACK NO. | INDEX (POINT) | contents | main data contents |
|---|---|---|---|---|---|
| | | | | lowest TNO | performer, |
| | | | A 1 | $TNO_{HIGHEST}$: pre-mastered highest TNO | record number etc. |
| | | | A 2 | $TC_{LEAD-OUT}$: start time of pre-mastered lead-out | of CD data region |
| | | | A 3 | $TC_{MO-START}$: start time of User-TOC | |
| | | | A 4 | $TC_{MO-DATA}$: start time of Recordable area | |
| | | | F F | $MO_{INF}$: DISC Information | |
| CD data (premastered area) | P | 0 1 . . . N | 0 0 . . . 9 9 | optional pre-mastered area | |
| MO read-in (User's (TOC) | R | 0 A | frames | No Recording | No Recording |
| | | | B0(10) | $TNO_{LOWEST}$: recorded lowest TNO | title, performer, |
| | | | B1(10) | $TNO_{HIGHEST}$: recorded highest TNO | recording data etc. |
| | | | B2(10) | $TM_{MOST-OUTER}$: stop time of most outer recorded EFM | of each song of the MO data |
| | | | B3(10) | $TM_{MOST-OUTER}$: stop time of latest recorded track | region |
| | | | N+1(10) . . . 99(10) | $TM_{START-STOP}(M)$: start and stop time of each recorded track, control | |
| | | | C0(10) C1(10) | Disc Label | zero |
| | | | D0(10) . . . DE(10) | Disc FTS table | |
| | | | | Power of calibration Area Reserved area | |
| MO data (Recordable area) | R | E E | 0 1 | Recordable area | |
| Lead-out | P | A A | 0 1 | Pre-mastered Lead-out | zero |

P: Pre-mastered pits
R: Recordable groove
N = 00–98

Referring again to Table 2, showing the record contents of the magneto-optical disc 30, there are recorded, in its MO lead-in region 36, as the TOC data indicating recording positions for the MO data region 35, an air number $TNO_{LOWEST}$ of the first song recorded on the disc, an air number $TNO_{HIGHEST}$ of the last song recorded on the disc, a time code $TM_{MOST-OUTER}$ indicating the end time of the EFM data recorded on the outermost track, a time code $TM_{LASTEST}$ indicating the end time of the last recorded track, time codes $TM_{START-STOP}$ (M) indicating the start time and the end time of each prerecorded track, disc label and disc characteristics data FTS, as sub-coded Q-channel signals, and display data including title, player, recording data etc. of each song recorded in the MO data region 35 as well as title, player or recording number etc. of the MO data region 35, as the user TOC data.

With the disc recording/reproducing apparatus, shown in FIG. 5, employing the magneto-optical disc 30 as a recording medium, data are recorded along a recording track of the magneto-optical disc 30, by rotating the disc 30 by a spindle motor 41, irradiating the disc 30 with a laser light from an optical head 43 and simultaneously applying a modulating magnetic field consistent with recording data by the magnetic head 44, while data are reproduced by tracing the recording track of the magneto-optical disc 30 with the laser light from the optical head 43.

The optical head 43 is constituted by a laser light source, such as a laser diode, optical devices including collimator lens, object lens, polarization beam splitter or a cylindrical lens, and split photodetectors, and is mounted for facing the magnetic head 44, with the magneto-optical disc 30 in-between. When recording data in the MO region 32 of the magneto-optical disc 30, the optical head 43 irradiates a laser light on a target track of the magneto-optical disc 30, to which a modulating magnetic field consistent with the recording data is applied by the magnetic head 44 driven by a head driving circuit 66 of the recording system as later described for recording data by thermo-magnetic recording. The optical head 43 detects a focusing error by e.g. an astigmatic method and a tracking error by an astigmatic method, by detecting the reflected laser light irradiated on the target track, while generating playback signals from the magneto-optical disc 30 by detecting the difference in the polarization angle (Kerr rotation angle) of the reflected laser light from the target track.

The playback output by the optical head 43 is supplied to an RF amplification circuit 45. The RF amplification circuit 45 extracts focusing and tracking error signals from the playback output of the optical head 43 to supply the extracted signals to a servo control circuit 46, while converting the reproduced signals into binary format signals which are supplied to a decoder 71 of the reproducing system as explained subsequently.

The servo control circuit 46 is constituted by, for example, a focusing servo control circuit, a tracking servo control circuit, a spindle motor servo control circuit and a thread servo control circuit. The focusing servo control circuit focusing controls the optical system of the optical head 43 so that the focusing error signals will be reduced to zero. The tracking servo control circuit tracking controls the optical system of the optical head 43 so that the tracking error signal will be reduced to zero. The spindle motor servo control circuit servo controls the spindle motor 47 so that the magneto-optical disc 30 will be rotationally driven at a predetermined rotational velocity. The thread servo control circuit shifts the optical head 43 and the magnetic head 44 to a target track position of the magneto-optical disc 30 designated by the system controller 47. The servo control circuit 46, which performs these various-control operations, supplies an information indicating the operating states of the various parts control led by the servo control circuit 46 to the system controller 47.

To the system controller 47 are connected a key input operating section 48 and a display section 49. The system controller 47 controls the recording system and the reproducing system with an operating mode designated by an operating input information entered by the key input operating section 48.

The system controller 47 causes the TOC data indicating the recording position of the CD data region 33 read out as a subcode Q-channel signal from the CD lead-in region 34 of the magneto-optical disc 30 is be stored in a TOC memory, and supervises the reproducing position of the CD data region 33 on the basis of the TOC data. The system controller 47 causes the display data concerning the recorded contents of the CD data region 33 read out as main data of the TOC data from the CD data region 34 of the magneto-optical disc 30 so as to be stored in the TOC memory 50 and performs a display control based on the display data so that the title, performer etc. of an song designated by the operation of the key input operating section 48 will be displayed on the display section 49.

The system controller 47 also automatically generates, during the recording mode, as user TOC data indicating recording positions of the MO data region 35 of the magneto-optical disc 30, an song number $TNO_{LOWEST}$ of the first song recorded on the disc, an song number $TNO_{HIGHEST}$ of the last air recorded on the disc, a time code $TM_{MOST-OUTER}$, indicating the end time of the EFM data recorded on the outermost track, a time code $TM_{LAST}$ indicating the end time of the last recorded track and time codes $TM_{START-STOP}$ indicating the start time and the end time of each prerecorded track for recording thereof in the MO lead-in region 36 as Q-channel sub-coded signals. The system controller 47 also accepts display data entered by the operation of the key input operating section 48 to record a title, performer, a recording data etc. of each song recorded in the MO data region 35 as well as a title, performer and a record number of the data region 35 of the MO data region in the MO lead-in region 36 as main data of the user TOC data.

The system controller 47 also stores the user TOC data, which indicate the recording positions of the MO data region 35 and which are read out from the MO lead-in region 38 of the magneto-optical disc 30 as the Q-channel subcoded signals, in the TOC memory 50 and, based on the user TOC data, and supervises the reproducing positions of the MO data region 35. The system controller 47 also stores display data on the record contents of the MO data region 50, read out from the MO lead-in region 36 of the magneto-optical disc 30 as the main data of the user TOC data and, based on the display data, performs a display control of display the title, performer etc. of an song designated by the operation of the key input operating section 48 on the display section 49.

The recording system of the disc recording/reproducing apparatus is provided with an A/D converter 62 supplied with an analog audio signal $A_{IN}$ from an input terminal 60 via a low-pass filter 61.

The A/D converter 62 quantizes the audio signals $A_{IN}$ and generates digital audio data of a predetermined transfer rate (75 sectors/second) corresponding to the CD-DA mode of the above mentioned CD-I system. The digital audio data obtained at the A/D converter 62 are supplied to an ADPCM encoder 63.

The ADPCM encoder 63 processes the digital audio data of the predetermined transfer rate, quantized from the audio signals $A_{IN}$ by the A/D converter 62, with data compression corresponding to various modes of the above mentioned CD-I system, and has operating mode designated by the system controller 47. With the present disc recording/reproducing apparatus, the CD-DA mode digital audio data are compressed by one fourth by the ADPCM encoder 63 so as to be converted into B-level stereo mode ADPCM audio data having a transfer rate of 18.75 (75/4) sectors/second. The B level stereo mode ADPCM audio data continuously outputted from the ADPCM encoder 63 at a transfer rate of 18.75 sectors/second, are supplied to a memory 64.

The memory 64 is control led by the system controller 47 as to data writing and readout so that the B-level stereo mode ADPCM audio data supplied from the ADPCM encoder 63 are continuously written in the memory 64 at the transfer rate of 18.75 sectors/second, while the B level stereo node ADPCM audio data written continuously in the memory 64 at the above mentioned transfer rate of 18.75 sectors/second are read out as record data in a burst fashion at the above mentioned transfer rate of 75 sectors/second.

Figure 7:
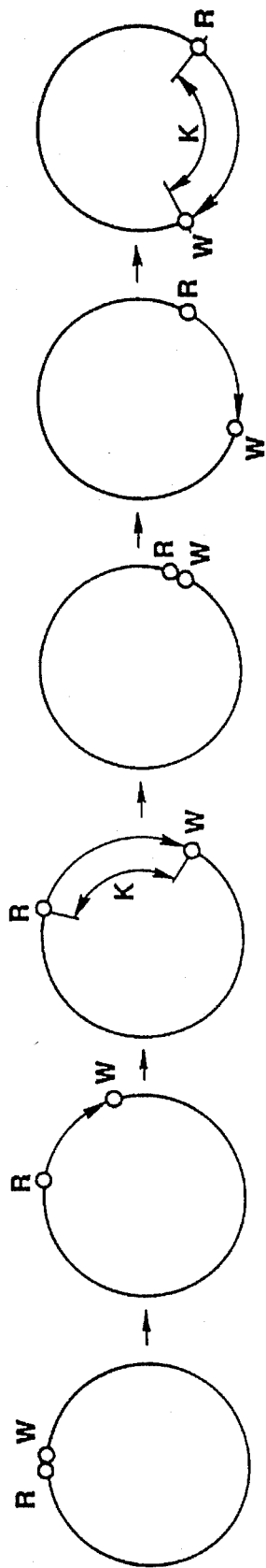
FIG. 7 shows the control status of a memory in a recording system of the disc recording/reproducing apparatus shown in FIG. 5.

Referring to FIG. 7, the system controller 47 controls the memory 64 in such a manner that a write pointer W of the memory 14 is continuously incremented at the transfer rate of 18.75 sectors/second to write the ADPCM audio data continuously in the memory 64 at the transfer rate of 18.75 sectors/second and, when the data volume of the ADPCM data stored in the memory 46 exceeds a predetermined volume K, a read pointer R of the memory 64 is incremented in a burst fashion at the transfer rate of 75 sectors/second to read out a predetermined volume K of the ADPCM audio data as record data from the memory 64 at the above mentioned transfer rate of 75 sectors/second.

The ADPCM audio data read out from memory 64 at the above mentioned transfer rate of 75 sectors/second, that is the record data, are supplied to an encoder 65.

The encoder 65 processes the record data supplied from memory 64 in a burst fashion by encoding for error correction, or by EFM encoding. The encoded record data from the encoder 65 are supplied to the magnetic head driving circuit 66.

The above mentioned magnetic head 44 is connected to the magnetic head driving circuit 66 which drives the magnetic head 44 for applying a modulated magnetic field consistent with the record data to the magneto-optical disc 30.

Besides controlling the memory 64 as described above, the system controller 47 controls recording positions so that the record data read out from the memory 64 under memory control in a burst fashion is continuously recorded in a recording track of the magneto-optical disc 30. The record positions are controlled in such a manner that the record positions of the record data read out in a burst fashion from the memory 64 by the system controller 47 are supervised, and control signals designating the record positions on the recording track of the magneto-optical disc 30 are supplied to the servo circuit 46.

With the above described recording system of the disc recording/reproducing system, the ADPCM data continuously outputted from the ADPCM encoder 63 at the transfer rate of 18.75 sectors/second are written in the memory 64 at the above mentioned transfer rate of 18.75 sectors/second. When the volume of the ADPCM audio data stored in the memory 64 exceeds the predetermined volume K, the predetermined amount K of the ADPCM audio data is read out from memory 64 as record data in a burst fashion at the transfer rate of 75 sectors/second, so that the input data may be continuously-written in the memory 64 while more than a predetermined amount of a data writing region is perpetually maintained within memory 64. In addition, by controlling the recording positions on the recording track of the magneto-optical disc 30 by the system controller 47, the record data read out from the memory 64 in a burst fashion may be recorded continuously on the recording track of the magneto-optical disc 30. Besides, since more than the predetermined volume of the data writing region is perpetually procured within memory 64, as mentioned hereinabove, input data may be continuously written in the data writing region of more than the predetermined volume, even when the system controller 47 detects that a track jump etc. has occurred due to disturbance or the like so that the recording operation on the magneto-optical disc 30 has been discontinued, and the returning operation may be executed in the interim, so that the input data may be continuously recorded on the recording track of the magneto-optical disc 30.

The reproducing system Of the disc recording/reproducing apparatus is hereinafter explained.

The reproducing system is adapted for reproducing the record data continuously recorded on a recording track of the magneto-optical disc 30 by the above described recording system, and includes a decoder 71 to which is supplied a playback output produced on tracing the recording track of the magneto-optical disc 30 with a laser light from the optical head 43 and converted into binary format signals by the RF amplification circuit 45.

The decoder 71 is a counterpart device of the encoder of the above mentioned recording system, and is adapted for processing the binary playback output from the RF amplification circuit 45 with a decoding operation for error correction or with EFM decoding and for reproducing the above mentioned B level stereo mode ADPCM data at a transfer rate of 75 sectors/second which is faster than the regular transfer rate for the B-level stereo mode. The playback data obtained at the decoder 71 are supplied to a memory 72.

The memory 72 is controlled by the system controller 47 as to data writing and readout so that playback data supplied form decoder 71 at a transfer rate of 75 sectors/second are written in the memory 72 in a burst fashion at the transfer rate of 75 sectors/second, while the playback data written therein in a burst fashion at the transfer rate of 75 sectors/second are read out continuously at the regular transfer rate of the B level stereo mode of 18.75 sectors/second.

Figure 8:
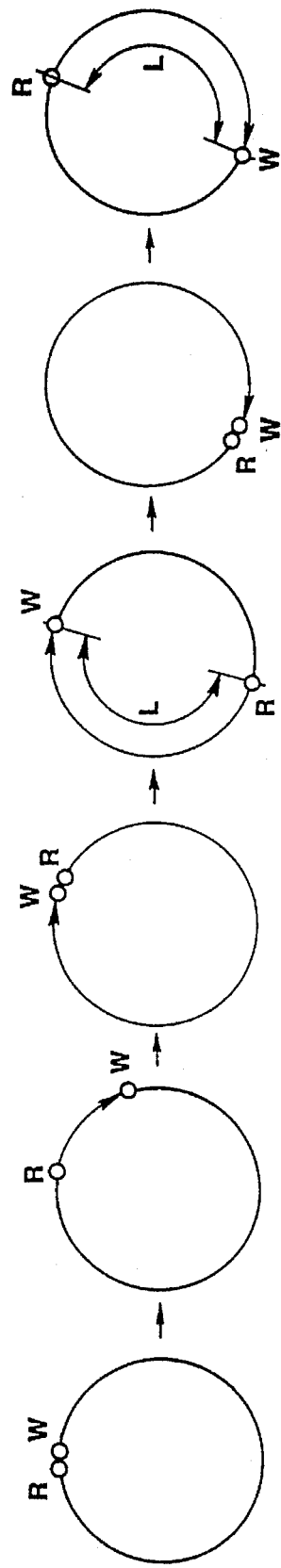
FIG. 8 shows the control status of a memory in a reproducing system of the disc recording/reproducing apparatus shown in FIG. 7.
Figure 9:
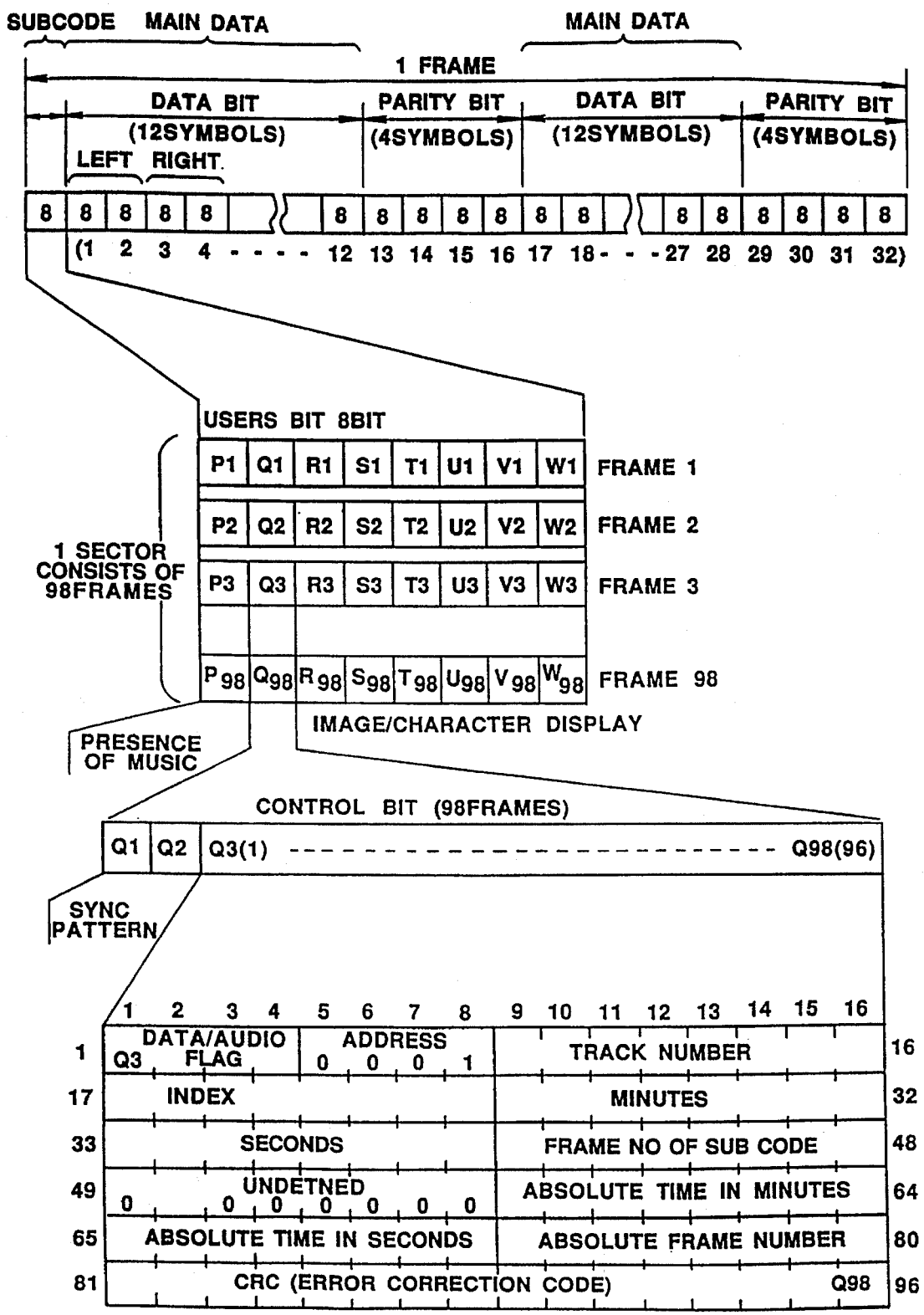
FIG. 9 shows the construction of one-frame data in a CD.

Referring to FIG. 8, the system controller 47 increments a write pointer W of the memory 72 at the transfer rate of 75 sectors/second to write the playback data in the memory 72 at the transfer rate of 75 sectors/second, while continuously incrementing a read pointer R of the memory 72 at the transfer rate of 18.75 sectors/second to read out the playback data continuously at the transfer rate of 18.75 sectors/second. The system controller increments the write pointer W of the memory 72 in a burst fashion at the transfer rate of 75 sectors/second by way of a memory control operation, so that writing is discontinued when the write pointer W catches up with the read pointer R and writing is executed when the data volume of the playback data stored in the memory 72 is lesser than a predetermined volume L.

Besides performing the above described memory control for the memory 72, the system controller 47 controls the reproducing positions so that the above mentioned playback data written from the memory 72 in the burst fashion by the memory control will be continuously reproduced from the recording track of the magneto-optical disc 30. For controlling the reproducing positions, the reproducing positions of the playback data read out from memory 72 by the system controller 47 in a burst fashion are supervised and control signals designating the reproducing positions on the recording track on the magneto-optical disc 30 are supplied to the servo control circuit 46.

The B level stereo mode ADPCM audio data, obtained as playback data read out continuously from memory 72 at the transfer rate of 18.75 sectors/second, are transmitted to the ADPCM decoder 73.

The ADPCM decoder 73, which is a counterpart device of the ADPCM decoder 63 of the recording system, has its operating mode designated by the system controller 47 and expands the B level stereo mode ADPCM audio data, in the present embodiment by a factor of four to reproduce the CD-DA mode digital audio data, which are supplied by the ADPCM decoder 73 to a D/A converter 74.

The D/A converter 74 processes the digital audio data from the ADPCM decoder 73 into analog signals to produce an analog audio signal $A_{OUT}$. The analog audio signal $A_{OUT}$, obtained by the D/A converter 74, is outputted via a low-pass filter 75 at an output terminal 76.

The reproducing system of the disc recording/reproducing apparatus is also provided with a digital outputting function so that the digital audio data are outputted by the ADPCM decoder 73 at a digital output terminal 78 via a digital output encoder 77 as a digital audio signal $D_{OUT}$.

With the above reproducing system of the disc recording/reproducing apparatus, since the B level stereo mode ADPCM audio data reproduced from the recording track of the magneto-optical disc 30 are written into memory 72 in a burst fashion at the transfer rate of 75 sectors/second and are continuously read from memory 72 as playback data at the transfer rate of 75 sectors/second, under memory control by the system controller 47, the playback data may be continuously read out from memory 72 while a data readout space in excess of a predetermined volume L is perpetually maintained in the memory 72. The playback data read out in a burst fashion from the memory 72 may be reproduced continuously from the recording track of the magneto-optical disc 30 by controlling the reproducing position on the recording track of the magneto-optical disc 30 by the system controller. Since the data readout space in excess of the predetermined volume L is perpetually maintained within memory 72, the playback data may be read continuously from the data readout region in excess of the data volume L to continue the outputting of the analog audio signals and the returning operation may be executed in the interim, even if the system controller 47 detects the occurrence of a track jump etc. due to disturbances or the like so that the reproducing operation from the magneto-optical disc 30 is interrupted.

Although the disc recording/reproducing apparatus has been described with reference to the recording and reproduction of the B level stereo mode ADPCM audio data, recording and reproduction of the ADPCM data of other modes of other CD-I systems may be achieved in a similar manner. It is noted that the PCM audio data of the CD-DA mode may be processed by the recording system with time compression at the memory 64 and record data may be recorded, while the magneto-optical disc 30 is driven at a high rotational velocity conforming to the time compression ratio, and time expansion may be carried out at the memory 72 of the reproducing system.

What is claimed is:

1. An information storage disc comprising a lead-in region in which display data of a record contents of a data region are recorded as main data and in which table-of-contents data indicating a record position of said data region are sub-coded and recorded.

2. The information storage disc according to claim 1 wherein said information storage disc is a reproduce-only compact optical disc.

3. The information storage disc according to claim 1 wherein said information storage disc is a magneto-optical disc comprising a reproduce-only region and a recordable region, and in that a lead-in region in which said display data are recorded as main data is provided in each of said reproduce-only region and said recordable region.

4. The information storage disc according to claim 1 wherein in said data region play data, including data of at least one song, are recorded and display data such as data of at least one of a title and a performer of said song are also recorded in said data region.

5. A disc comprising a lead-in region in which display data of a record contents of a data region are recorded as main data and in which table-of-contents data indicating a record position of said data region are recorded.

6. The disc according to claim 2, wherein in said data region play data, including data of at least one song, are recorded and display data such as data of at least one of a title and a performer of said song are also recorded in said data region.

7. The disc according to claim 3, wherein in said data region play data, including data of at least one song, are recorded and display data such as data of at least one of a title and a performer of said song are also recorded in said data region.

8. The disc according to claim 5, wherein in said data region play data, including data of at least one song, are recorded and display data such as data of at least one of a title and a performer of said song are also recorded in said data region.

9. An information storage disc recording apparatus comprising: recording means for recording in a lead-in region of an information storage disc, as main data, display data of a record contents of a data region of said information storage disc and table-of-contents data indicating a record position of said data region.

10. The disc according to claim 1, wherein in said data region play data, including data of at least one song, are recorded and display data such as data of at least one of a title and a performer of said song are recorded in said lead-in region.

11. The disc according to claim 2, wherein in said data region play data, including data of at least one song, are recorded and display data such as data of at least one of a title and a performer of said song are recorded in said lead-in region.

12. The disc according to claim 3, wherein in said data region play data, including data of at least one song, are recorded and display data such as data of at least one of a title and a performer of said song are recorded in said lead-in region.

13. The disc according to claim 5, wherein in said data region play data, including data of at least one song, are recorded and display data such as data of at least one of a title and a performer of said song are recorded in said lead-in region.

\* \* \* \* \*